(12) United States Patent
Atencio (10) Patent No.: US 6,722,603 B1
(45) Date of Patent: Apr. 20, 2004

(54) POWERED FISH TAPE REEL SYSTEM

(76) Inventor: Gilbert J. Atencio, P.O. Box 2083, Espanola, NM (US) 87532

( * ) Notice: Subject to any disclaimer, the term of this patent is extended or adjusted under 35 U.S.C. 154(b) by 0 days.

(21) Appl. No.: 10/360,095

(22) Filed: Feb. 7, 2003

(51) Int. Cl.$^7$ .............................................. B65H 75/48
(52) U.S. Cl. ................ 242/390.8; 242/390.9; 242/394.1; 254/134.3 R; 254/134.3 FT
(58) Field of Search ................. 254/134.3 FT, 254/134.3 R, 403, 411, 333; 292/390.8, 395, 390.9, 405.3, 394.1; 15/104.33, 104.31

(56) References Cited

U.S. PATENT DOCUMENTS

| | | | |
|---|---|---|---|
| 2,913,222 A | * 11/1959 | Kuzara | 254/134.3 FT |
| 3,612,487 A | * 10/1971 | Raney et al. | 254/269 |
| 3,776,179 A | * 12/1973 | Raney et al. | 118/708 |
| 4,917,362 A | * 4/1990 | Wilson | 254/134.3 FT |
| 4,956,889 A | 9/1990 | Kirk | 15/104.33 |
| 5,423,516 A | 6/1995 | Blaha | 254/134.3 |
| 5,692,662 A | 12/1997 | Fladl et al. | 226/177 |
| 5,810,277 A | 9/1998 | Cielker et al. | 242/395 |
| 6,361,021 B1 | * 3/2002 | Brennan | 254/134.3 FT |
| 6,409,154 B1 | * 6/2002 | Quinn | 254/134.3 FT |
| 6,513,791 B1 | * 2/2003 | Yates | 254/134.3 FT |

* cited by examiner

Primary Examiner—Emmanuel Marcelo
(74) Attorney, Agent, or Firm—Michael S. Neustel (57) ABSTRACT

A powered fish tape reel system for efficiently pushing and drawing fish tape within an elongate tubular structure. The powered fish tape reel system includes a hub member for receiving and dispensing a length of fish tape, a first cover and a second cover surrounding the hub member, and a motor unit mechanically connected to the hub member for rotating the hub member in a desired direction at a desired rotational speed. A first handle and a second handle are preferably attached on opposing sides of the covers for grasping.

20 Claims, 10 Drawing Sheets

POWERED FISH TAPE REEL SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fish tape reels and more specifically it relates to a powered fish tape reel system for efficiently pushing and drawing fish tape within an elongate tubular structure.

2. Description of the Related Art

Fish tape reels have been in use for years. A conventional fish tape reels have a housing with a reel rotatably positioned within for receiving and dispensing the fish tape. U.S. Pat. No. 5,423,516 illustrates an exemplary conventional fish tape reel.

The main problem with conventional fish tape reels is that they are inefficient for individuals to utilize. A further problem with conventional fish tape reels is that they require significant time and labor to push or draw fish tape from conduit, ductwork or other structures.

Examples of patented devices which may be related to the present invention include U.S. Pat. No. 5,692,662 to Fladl et al.; U.S. Pat. No. 5,423,516 to Blaha; U.S. Pat. No. 4,956,889 to Kirk; and U.S. Pat. No. 5,810,277 to Cielker et al.

While these devices may be suitable for the particular purpose to which they address, they are not as suitable for efficiently pushing and drawing fish tape within an elongate tubular structure. Conventional fish tape reel devices are inefficient and require significant labor to utilize.

In these respects, the powered fish tape reel system according to the present invention substantially departs from the conventional concepts and designs of the prior art, and in so doing provides an apparatus primarily developed for the purpose of efficiently pushing and drawing fish tape within an elongate tubular structure.

BRIEF SUMMARY OF THE INVENTION

In view of the foregoing disadvantages inherent in the known types of fish tape reels now present in the prior art, the present invention provides a new powered fish tape reel system construction wherein the same can be utilized for efficiently pushing and drawing fish tape within an elongate tubular structure.

The general purpose of the present invention, which will be described subsequently in greater detail, is to provide a new powered fish tape reel system that has many of the advantages of the fish tape reels mentioned heretofore and many novel features that result in a new powered fish tape reel system which is not anticipated, rendered obvious, suggested, or even implied by any of the prior art fish tape reels, either alone or in any combination thereof.

To attain this, the present invention generally comprises a hub member for receiving and dispensing a length of fish tape, a first cover and a second cover surrounding the hub member, and a motor unit mechanically connected to the hub member for rotating the hub member in a desired direction at a desired rotational speed.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a powered fish tape reel system that will overcome the shortcomings of the prior art devices.

A second object is to provide a powered fish tape reel system for efficiently pushing and drawing fish tape within an elongate tubular structure.

Another object is to provide a powered fish tape reel system that reduces the amount of time required to push or draw fish tape within conduit, ductwork or other structures.

An additional object is to provide a powered fish tape reel system that reduces the physical demands and frustrations from an individual.

A further object is to provide a powered fish tape reel system that conveniently pushes and draws various lengths of fish tape.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, FIGS. 1 through 9 illustrate a powered fish tape reel system 10, which comprises a hub member 20 for receiving and dispensing a length of fish tape 24, a first cover 40 and a second cover 50 surrounding the hub member 20, and a motor unit 30 mechanically connected to the hub member 20 for rotating the hub member 20 in a desired direction at a desired rotational speed. The fish tape 24 may be utilized to draw wire 14 or other elongate objects through conduit 12 and other structures.

Figure 3:
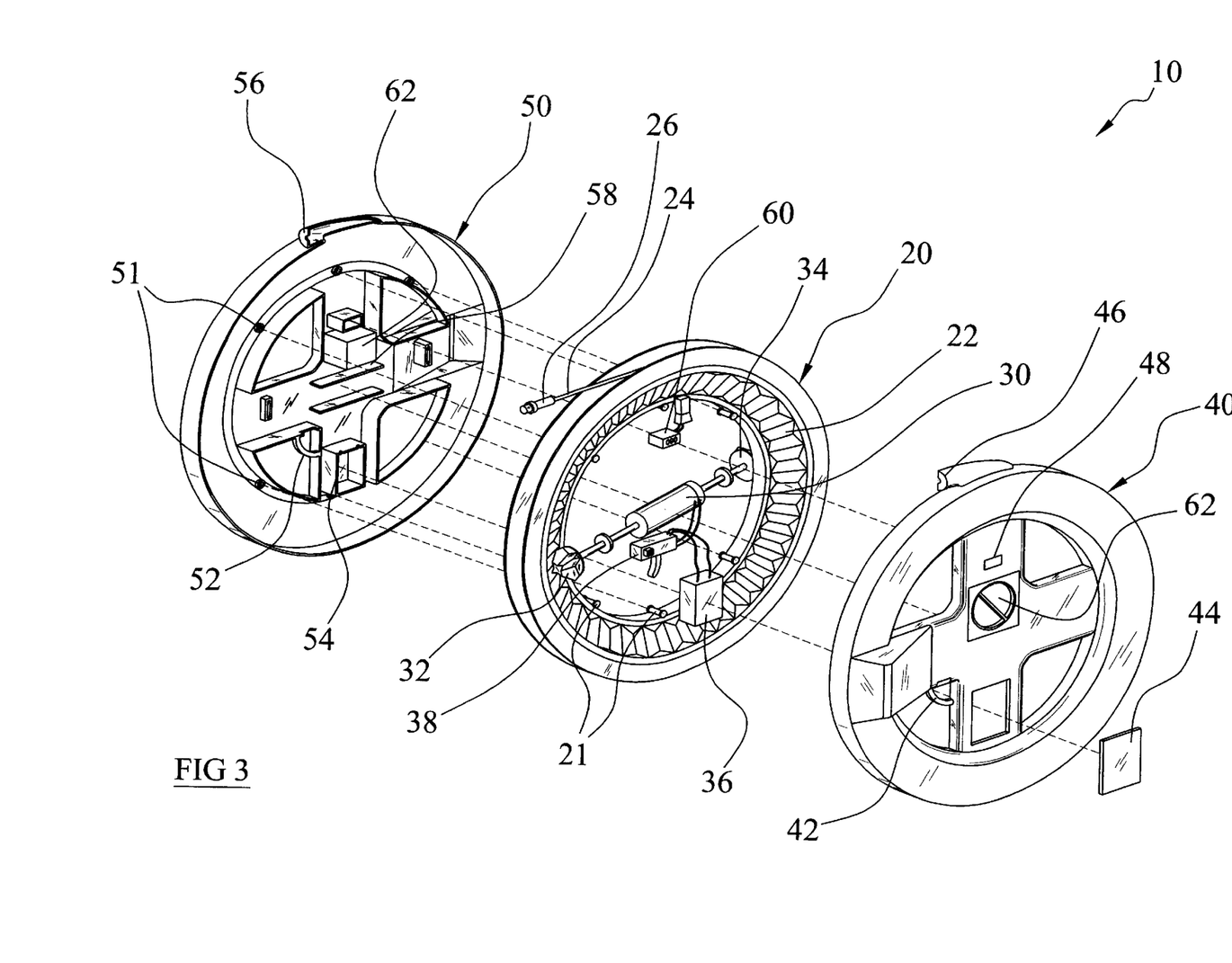
FIG. 3 is an exploded upper perspective view of the present invention.

FIG. 3 best illustrates the hub member 20 which is preferably comprised of a circular structure with an outer channel within for receiving the length of fish tape 24. The hub member 20 is rotatably positioned within the housing comprised of a first cover 40 and a second cover 50 for allowing relatively free rotation of the hub member 20. The hub member 20 may be rotatably supported within the housing by an inner bearing structure or other commonly utilized bearing structure. The hub member 20 may have various other shapes and structures capable of receiving and dispensing a length of fish tape 24.

Figure 2:
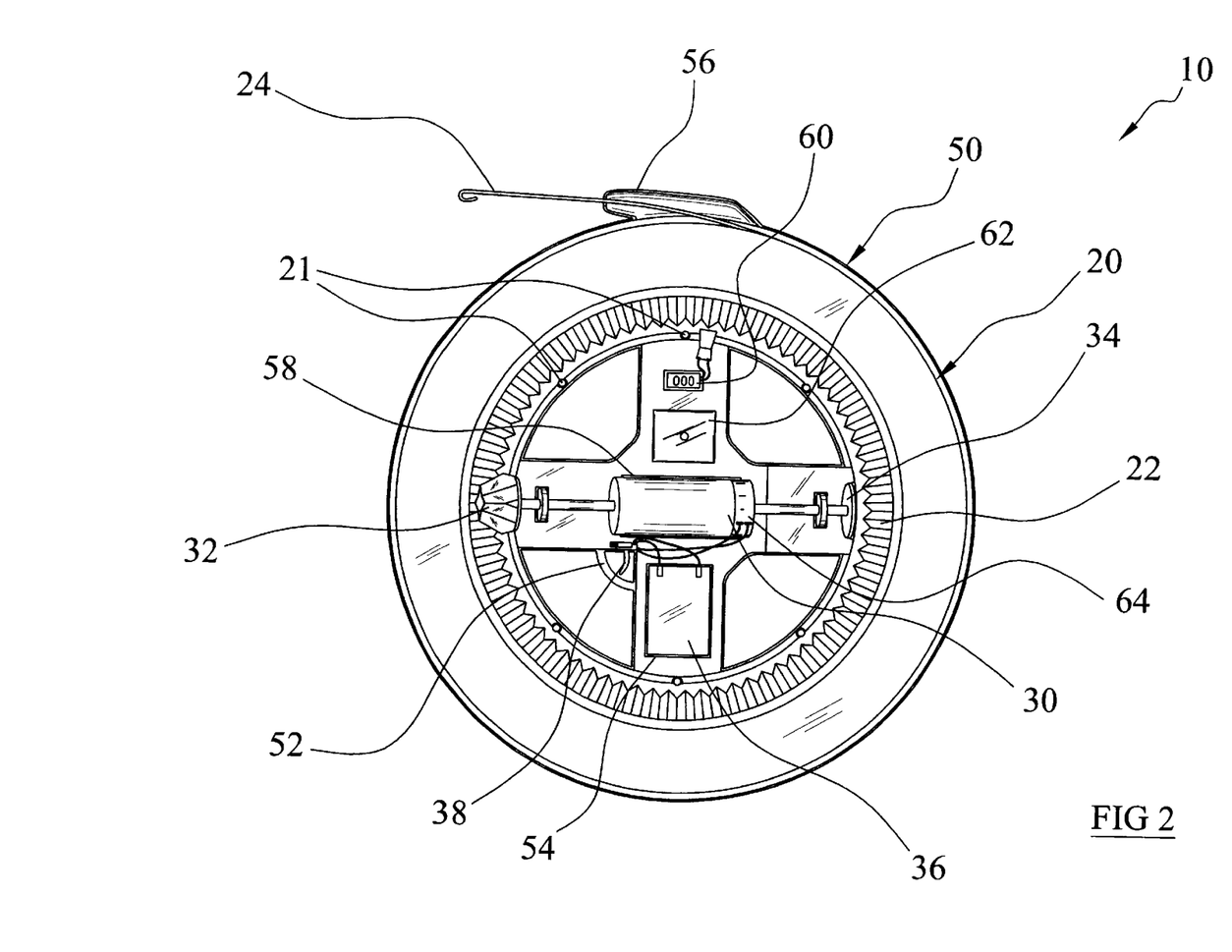
FIG. 2 is a side view of the present invention with the first cover removed.

The hub member 20 preferably has a main gear 22 having a circular structure within the side of the hub member 20 as shown in FIGS. 2 and 3 of the drawings. There are preferably two main gears 22 on opposing sides of the hub member 20 for allowing engagement by a first gear 32 and a second gear 34 attached to the motor unit 30. The main gear 22 may have various gear structures commonly utilized.

Figure 10:
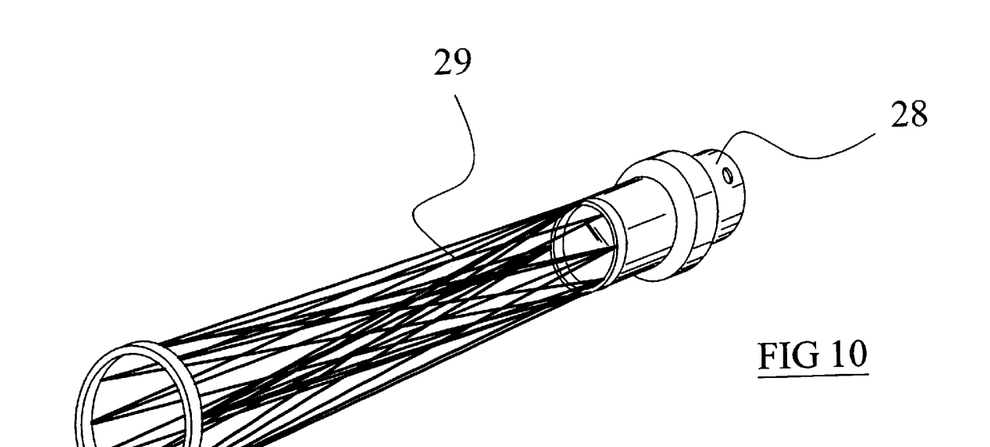
FIG. 10 is a perspective view of a catch member utilized to grasp a cable or other structure.
Figure 11:
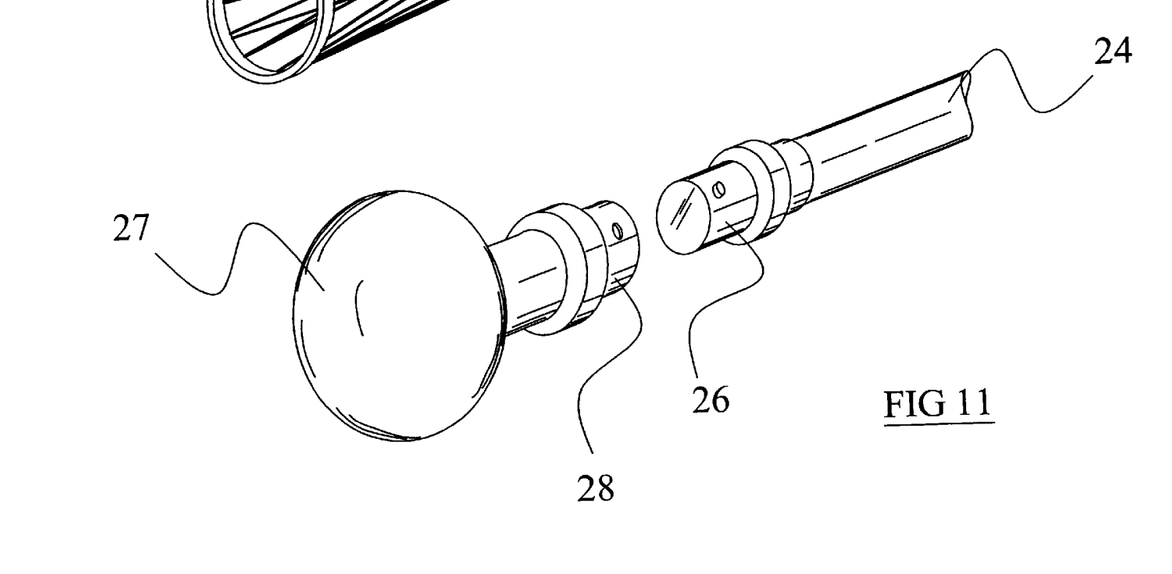
FIG. 11 is an exploded perspective view of the coupler and ball member structure.

The fish tape 24 may have various distal end structures such as hooked (FIG. 2), a catch member 29 (FIG. 10) or a ball member 27 (FIG. 11). When a catch member 29 or a ball member 27 are utilized, a first coupler 26 is preferably attached to the distal end of the fish tape 24 and a second coupler 28 is attached to the respective attachment (catch member 29 or ball member 27) as shown in FIGS. 10 and 11 of the drawings. The ball member 27 allows the fish tape 24 to pass through various structures and conduit 12 without obstruction or interference. The catch member 29 is preferably comprised of an elongate self-catching structure that squeezes upon the wire 14 being pulled thereby creating a relatively small size.

Figure 1:
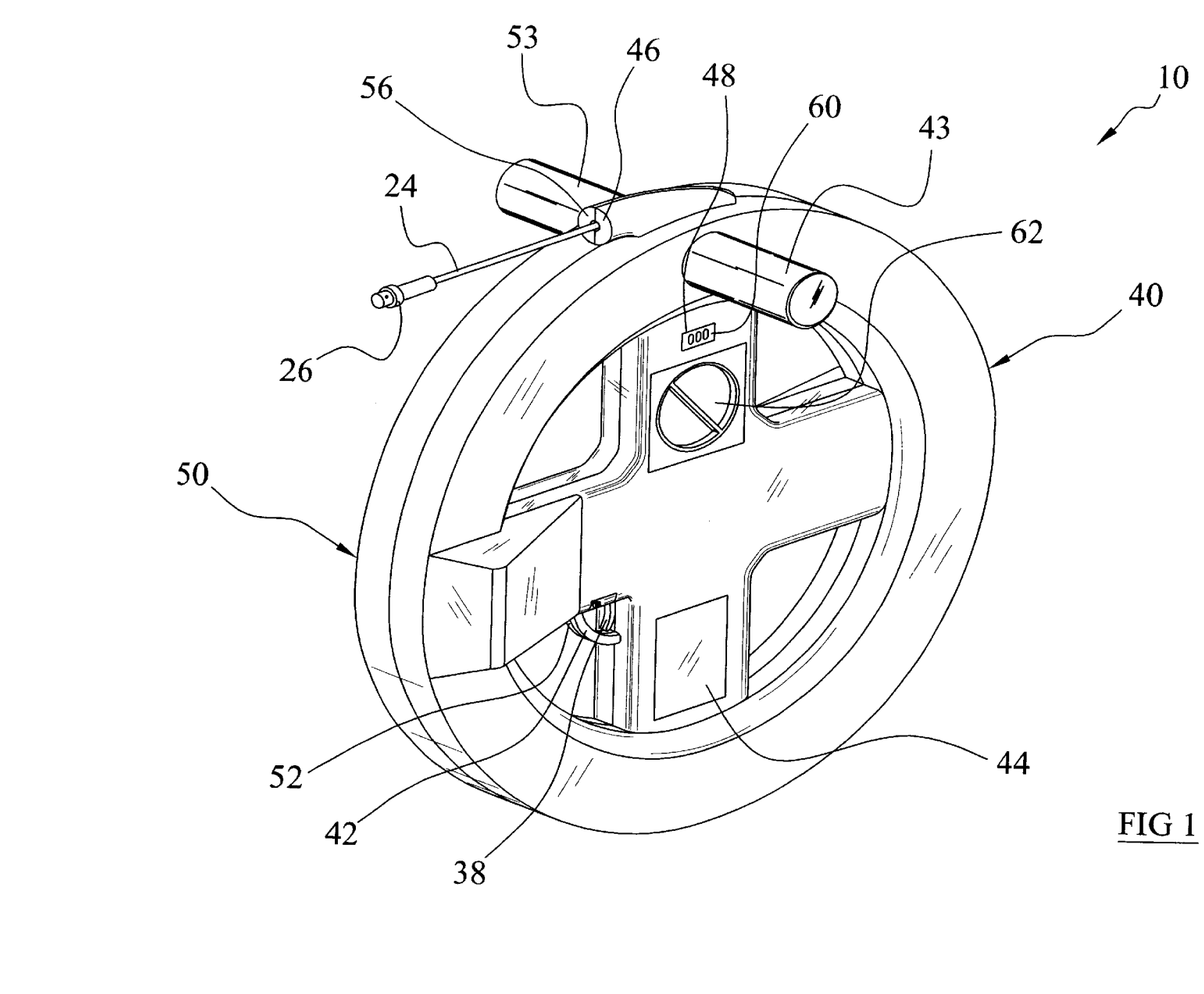
FIG. 1 is an upper perspective view of the present invention.

As shown in FIGS. 1 and 3 of the drawings, the housing surrounding the hub member 20 is preferably comprised of a first cover 40 and a second cover 50. A first handle 43 is preferably attached to the first cover 40 and a second handle 53 is preferably attached to the second cover 50 as shown in FIG. 1 of the drawings. The user grasps the handles 43, 53 during the operation of the invention to reduce movement thereof. The handles 43, 53 are may be comprised of a removable, foldable or permanent structure with respect to the covers 40, 50.

The first cover 40 preferably has a removable battery cover 44 along with a counter aperture 48 for positioning of the counter unit 60 within for displaying the length of fish tape 24 dispensed or drawn. The first cover 40 preferably has a circular shape, however various other shapes may be utilized. A first guide 46 of the first cover 40 in opposition to a second guide 56 of the second cover 50 preferably receives and dispenses the length of fish tape 24 from the hub member 20.

The second cover 50 is formed similar in shape and structure to the first cover 40. The second cover 50 has an inner portion for rotatably receiving the hub member 20. A plurality of second receivers 51 within the second cover 50 receive guide members 21 from the hub member 20 thereby supporting the inner bearing of the hub member 20 in a fixed position. A corresponding plurality of first receivers (not shown) in opposition to the second receivers 51 are preferably utilized for receiving the guide members 21. The second cover 50 may be attached to the first cover 40 using various conventional fasteners.

As shown in FIGS. 2 and 3 of the drawings, a battery compartment 54 is positioned within the second cover 50 for receiving the battery unit 36. The battery unit 36 may be comprised of rechargeable or non-rechargeable batteries or similar electrical power source. A battery cover 44 is removably attachable to the first cover 40 thereby allowing access to the battery unit 36 within the battery compartment 54 as shown in FIG. 3 of the drawings.

Figure 9:
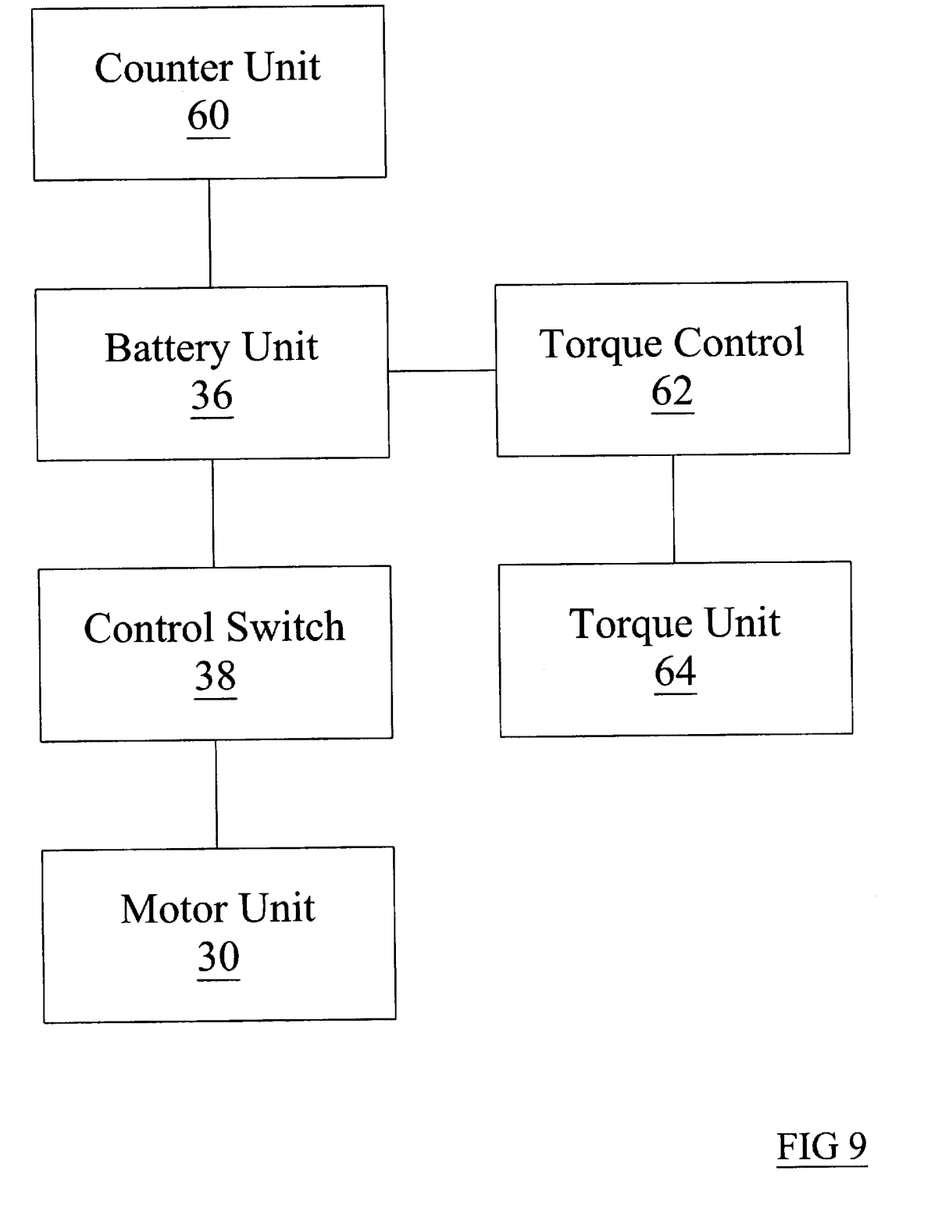
FIG. 9 is a block diagram illustrating the electrical components of the present invention.

The battery unit 36 is electrically connected to the control switch 38 and the counter unit 60 as best illustrate in FIG. 9 of the drawings. The counter unit 60 is positioned adjacent to the hub member 20 for calculating the rotational distance traveled wherein the counter unit 60 displays the total length of fish tape 24 dispensed or drawn in with respect to the hub member 20.

Figure 4:
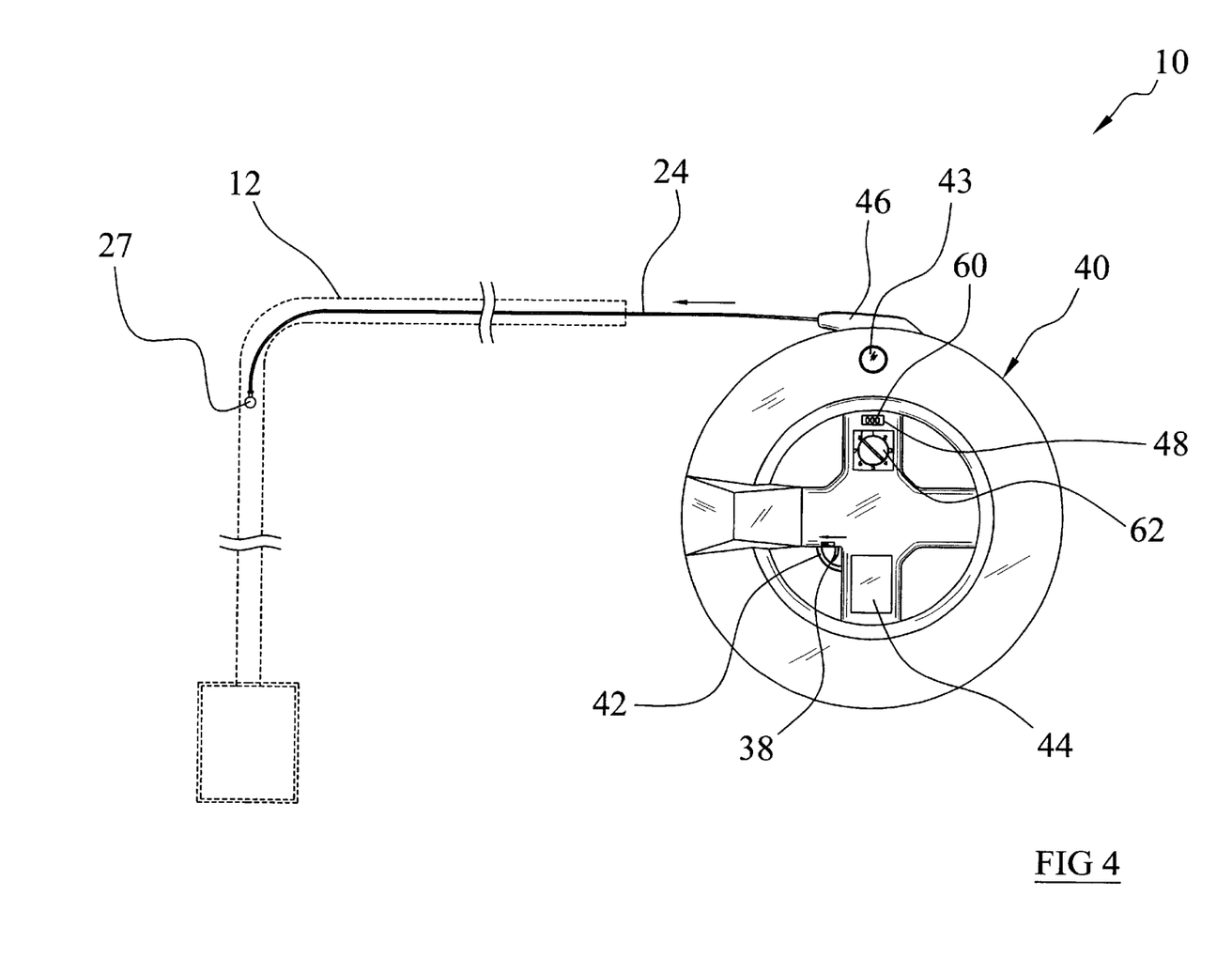
FIG. 4 is a side view of the present invention dispensing a length of fish tape into conduit.
Figure 5:
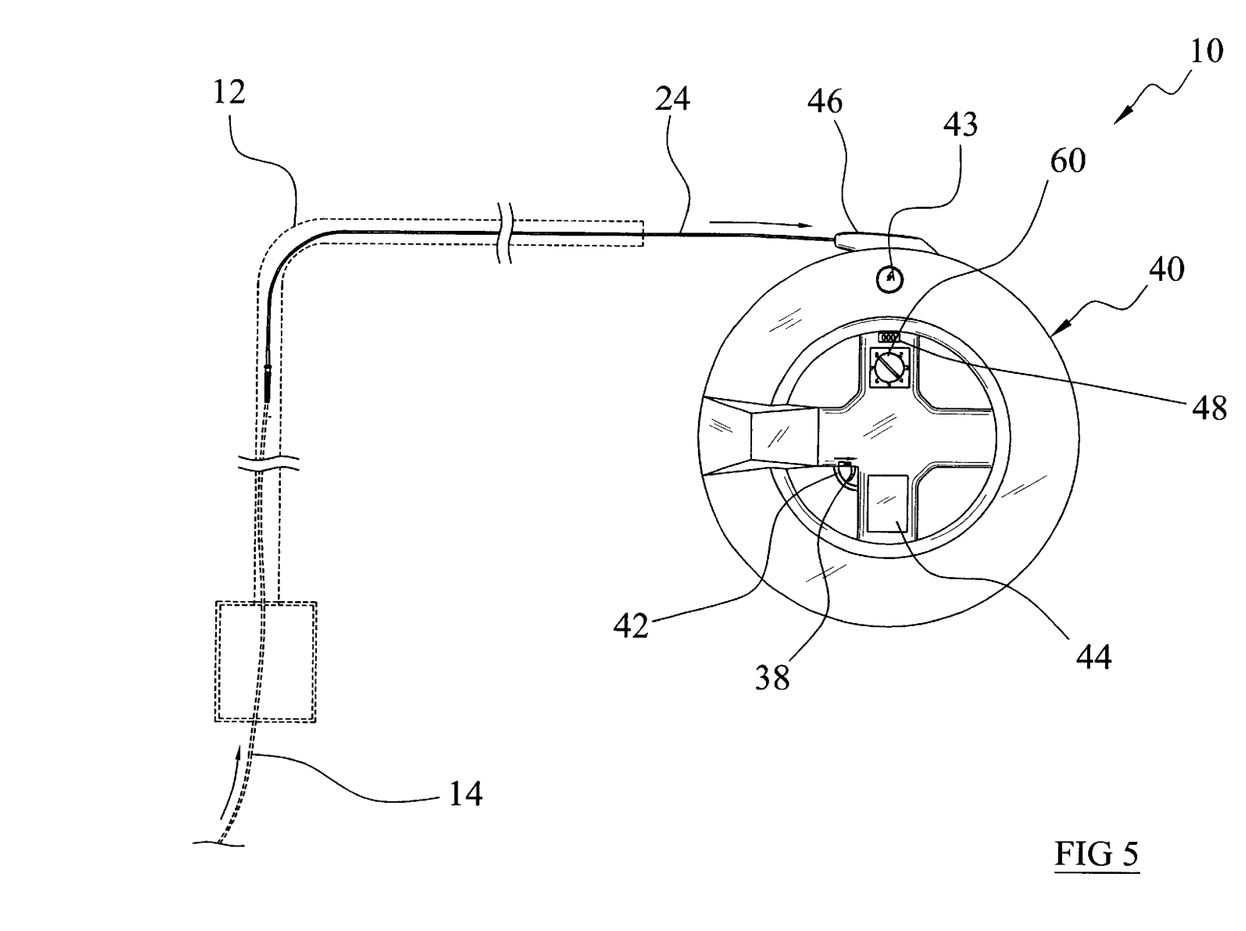
FIG. 5 is a side view of the present invention drawing a length of fish tape from within conduit with a length of wire attached.

The counter unit 60 may utilize various conventional technologies for counting the rotational distance traveled by the hub member 20 and may express the distance/length in various units such as but not limited to inches, centimeters and feet. The display of the counter unit 60 may be comprised of an LED, digital or physical wheel display. The display is shown through the counter aperture 48 within the first cover 40 as best illustrated in FIGS. 4 and 5 of the drawings.

The control switch 38 is electrically connected to the motor unit 30 for controlling the speed and the rotational direction of the motor unit 30. The control switch 30 is preferably comprised of a trigger style switch, however various other switch structures may be utilized. The control switch 38 is preferably a variable switch for providing variable power to the motor unit 30, however a stepper switch may also be utilized for providing various magnitudes of electrical power to the motor unit 30 for controlling the speed of the motor unit 30.

A polarity switch is preferably included within the control switch 38 for controlling the rotational direction of the motor unit 30 for dispensing or retracting the fish tape 24 with respect to the present invention. As shown in FIG. 3 of the drawings, a first guard 42 and a second guard 52 are attached to the first cover 40 and second cover 50 respectively for protecting the control switch 38 from accidental manipulation.

As shown in FIGS. 2 and 3 of the drawings, the motor unit 30 is positioned between a pair of motor brackets 58 extending from the second cover 50. The motor unit 30 may be comprised of any electrical powered motor preferably a DC motor. It can be appreciated the opposing motor brackets 58 may extend from the first cover 40 also for receiving the motor unit 30 in a secure manner. The motor unit 30 has one or more shafts rotatably extending from thereof. As shown in FIGS. 2 and 3 of the drawings, a first shaft and a second shaft extend from the motor unit 30 from opposing ends of the motor unit 30.

It is preferable to have a torque unit 64 attached to the shafts to limit the amount of torque allowed to be applied to the hub member 20 through the shafts as shown in FIG. 2 of the drawings. The torque unit 64 is preferably controlled by a torque control 62 within the covers 40, 50 wherein the torque control 62 is electrically connected to the battery unit 36 as shown in FIG. 9 of the drawings. The torque control 62 is preferably a switch structure that allows the operator to select the desired amount of torque limitation which will limit the pulling force upon the fish tape 24 and wire 14. For example the torque control 62 may allow limiting the amount of torque to between 2 to 90 foot-lbs. This prevents damage to the wire 14 being pulled through the conduit 12. The torque unit 64 simply slips when the torque exceeds the desired level.

A first gear 32 and a second gear 34 are attached to the first shaft and the second shaft of the motor unit 30 respectively for engaging opposing main gears 22 of the hub member 20 thereby rotating the hub member 20 in the desired direction. It can be appreciated that if the first shaft and the second shaft of the motor unit 30 rotate in opposite directions that the first gear 32 and the second gear 34 may be utilized upon a single main gear 22 of the hub member 20. A pair of disk members are preferably attached to the shafts of the motor unit 30 and are rotatably received within a slotted bracket within the first cover 40 and the second cover 50 as shown in FIGS. 2 and 3 of the drawings.

Figure 6:
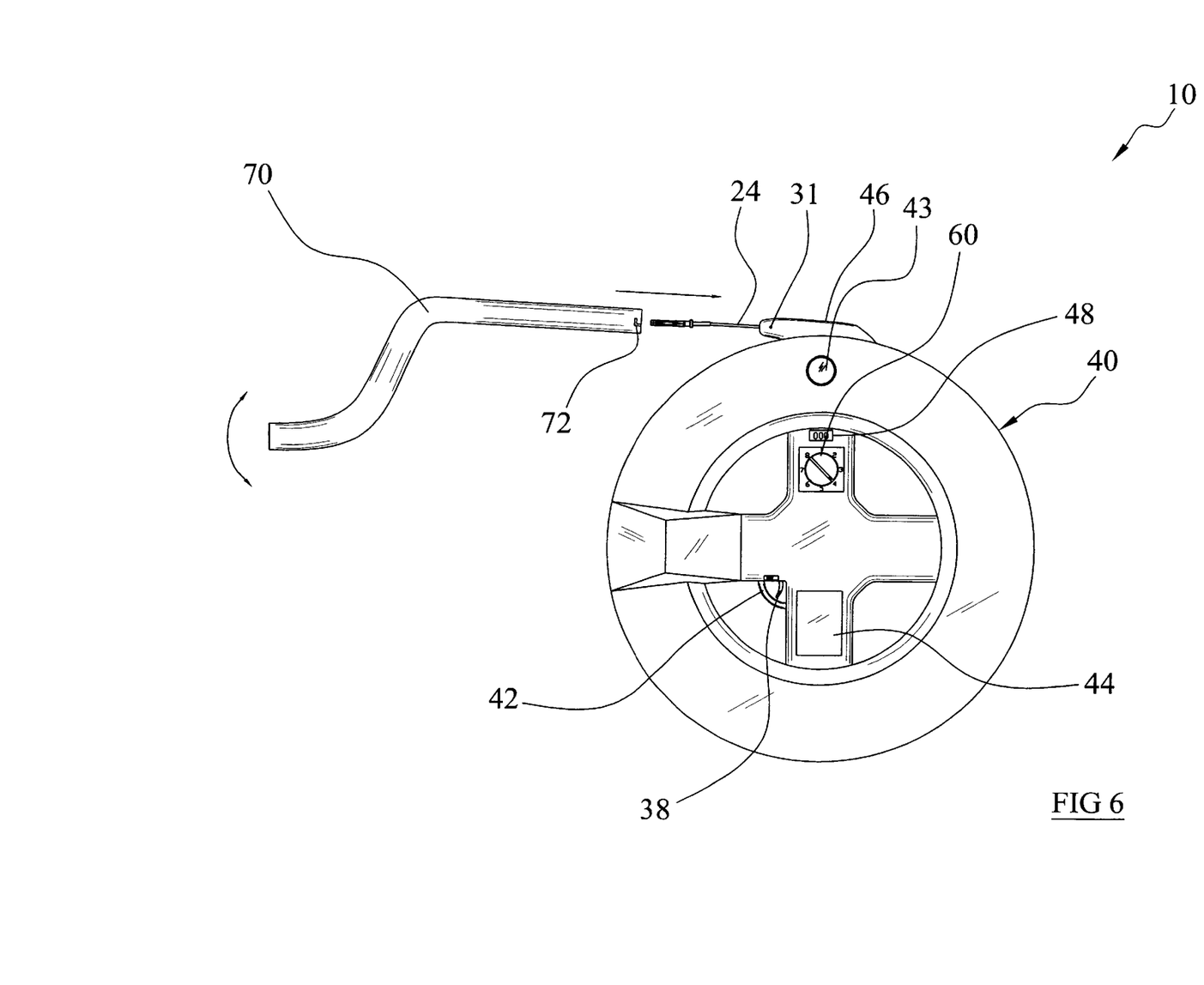
FIG. 6 is an exploded side view of the present invention with a guide tube.
Figure 7:
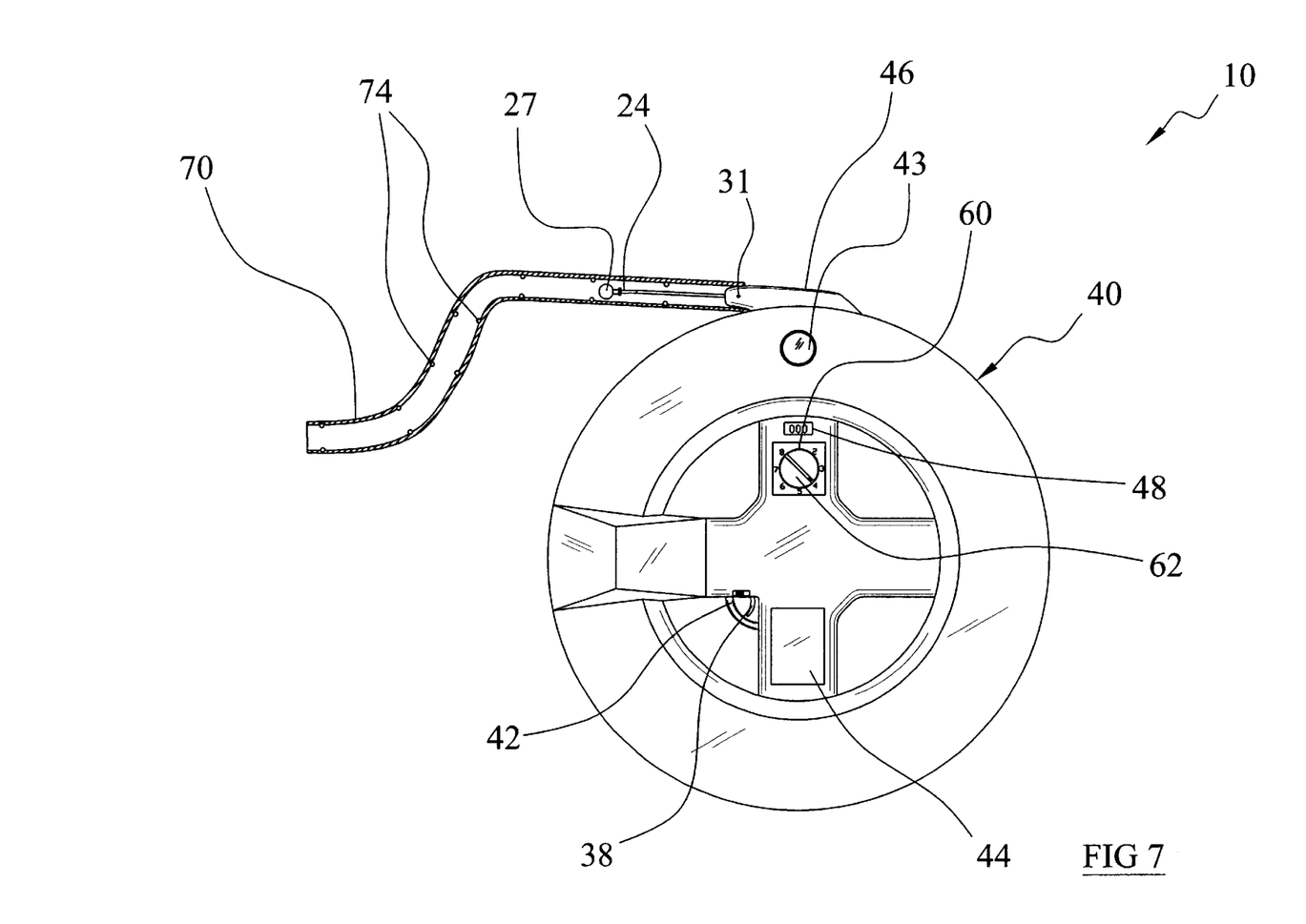
FIG. 7 is a side view of the present invention with the guide tube partially cutaway.
Figure 8:
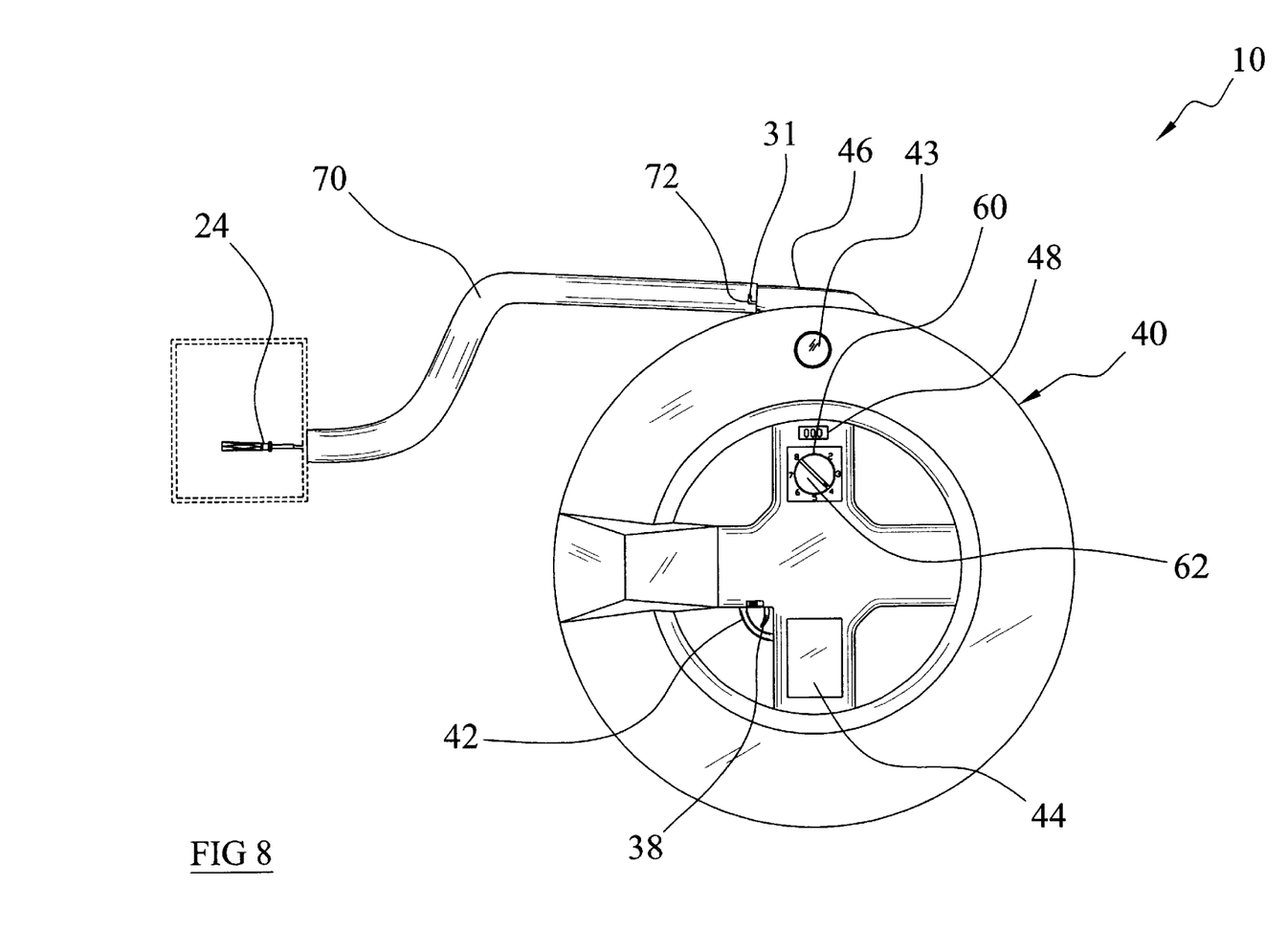
FIG. 8 is a side view of the present invention with the guide tube positioned adjacent to an electrical box.

FIGS. 6 through 8 illustrate the usage of a guide tube 70 having at least one connecting slot 72 removably attachable to the first guide 46 and the second guide 56 of the covers 40, 50. The connecting slot 72 catchably receives an extended member 31 extending from the guides 46, 56. The guide tube 70 may have various shapes and lengths for assisting in the guiding of the fish tape 24 into a structure such as conduit 12 or an electrical box. As shown in FIG. 7 of the drawings, a plurality of roller members 74 are preferably rotatably positioned within the interior of the guide tube 70 for assisting in the guiding of the fish tape 24 with reduced resistance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A powered fish tape reel system, comprising:
   a housing having an interior and a guide aperture;
   a hub member rotatably positioned within said housing;
   a length of fish tape positioned about said hub member and extending through said guide aperture;
   a motor unit attached within said housing and mechanically connected to said hub member for rotating said hub member; and
   a control switch electrically connected to said motor unit for controlling operation of said motor unit.

2. The powered fish tape reel system of claim 1, wherein said housing is comprised of a first cover and a second cover attached to one another.

3. The powered fish tape reel system of claim 1, wherein said control switch controls the direction of rotation of said hub member.

4. The powered fish tape reel system of claim 1, wherein said control switch controls the speed of rotation of said hub member.

5. The powered fish tape reel system of claim 1, wherein said control switch controls the direction of rotation and the speed of rotation of said hub member.

6. The powered fish tape reel system of claim 1, including a counter unit positioned within said housing for calculating a length of said fish tape dispensed from said hub member.

7. The powered fish tape reel system of claim 1, wherein said hub member includes at least one main gear, and wherein said motor unit includes at least one drive gear mechanically connected to said at least one main gear.

8. The powered fish tape reel system of claim 7, wherein said at least one main gear is positioned within an interior circular portion of said hub member.

9. The powered fish tape reel system of claim 1, wherein said hub member includes a first main gear and a second main gear on opposing sides of said hub member, and wherein said motor unit includes a first drive gear and a second drive gear mechanically connected to said first main gear and said second main gear respectively.

10. The powered fish tape reel system of claim 1, including a first coupler attached to a distal end of said fish tape that removably receives a second coupler, and an attachment structure attached to said second coupler, wherein said attachment structure is selected from a group comprising a ball member and a catch member.

11. A powered fish tape reel system, comprising:
   a housing having an interior and a guide structure having a guide aperture;
   a length of guide tube removably attached to said guide structure;
   a hub member rotatably positioned within said housing;
   a length of fish tape positioned about said hub member and extending through said guide aperture;
   a motor unit attached within said housing and mechanically connected to said hub member for rotting said hub member;
   a torque unit mechanically connected between said motor unit and said hub member;
   a torque control electrically connected to said torque unit for controlling said torque unit; and
   a control switch electrically connected to said motor unit for controlling operation of said motor unit.

12. The powered fish tape reel system of claim 11, wherein said housing is comprised of a first cover and a second cover attached to one another.

13. The powered fish tape reel system of claim 11, wherein said control switch controls the direction of rotation of said hub member.

14. The powered fish tape reel system of claim 11, wherein said control switch controls the speed of rotation of said hub member.

15. The powered fish tape reel system of claim 11, wherein said control switch controls the direction of rotation and the speed of rotation of said hub member.

16. The powered fish tape reel system of claim 11, including a counter unit positioned within said housing for calculating a length of said fish tape dispensed from said hub member.

17. The powered fish tape reel system of claim 11, wherein said hub member includes at least one main gear, and wherein said motor unit includes at least one drive gear mechanically connected to said at least one main gear.

18. The powered fish tape reel system of claim 17, wherein said at least one main gear is positioned within an interior circular portion of said hub member.

19. The powered fish tape reel system of claim 11, wherein said hub member includes a first main gear and a second main gear on opposing sides of said hub member, and wherein said motor unit includes a first drive gear and a second drive gear mechanically connected to said first main gear and said second main gear respectively.

20. The powered fish tape reel system of claim 11, including a first coupler attached to a distal end of said fish tape that removably receives a second coupler, and an attachment structure attached to said second coupler, wherein said attachment structure is selected from a group comprising a ball member and a catch member.

* * * * *